(12) United States Patent
Furuya (10) Patent No.: US 7,711,131 B2
(45) Date of Patent: May 4, 2010

(54) ELECTRIC-ACOUSTIC TRANSDUCER AND ELECTRIC-ACOUSTIC TRANSDUCER/HOUSING ASSEMBLY

(75) Inventor: Masahito Furuya, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 1162 days.

(21) Appl. No.: 11/318,697

(22) Filed: Dec. 27, 2005

(65) Prior Publication Data
US 2006/0153417 A1    Jul. 13, 2006

(30) Foreign Application Priority Data
Dec. 28, 2004    (JP)    ............... 2004-382174

(51) Int. Cl.
*H04R 25/00*    (2006.01)
(52) U.S. Cl. .............. 381/182; 381/351; 381/401; 381/396
(58) Field of Classification Search .......... 381/182, 381/184, 186, 345, 351, 386, 401, 396
See application file for complete search history.

(56) References Cited
U.S. PATENT DOCUMENTS

| | | | |
|---|---|---|---|
| 6,711,274 B2 | 3/2004 | Asahina et al. | |
| 6,744,895 B2 * | 6/2004 | Miyamoto et al. | 381/182 |
| 7,050,600 B2 * | 5/2006 | Saiki et al. | 381/388 |
| 7,106,878 B2 * | 9/2006 | Saiki et al. | 381/396 |
| 7,505,602 B2 * | 3/2009 | Eaton | 381/351 |
| 7,519,191 B2 * | 4/2009 | Enomoto et al. | 381/186 |
| 2004/0071303 A1 * | 4/2004 | Furuya et al. | 381/182 |
| 2004/0071309 A1 | 4/2004 | Furuya et al. | |

* cited by examiner

*Primary Examiner*—Curtis Kuntz
*Assistant Examiner*—Ryan C Robinson
(74) *Attorney, Agent, or Firm*—Brinks Hofer Gilson & Lione (57) ABSTRACT

An electric-acoustic transducer/housing assembly includes an electric-acoustic transducer and a housing within which the electric-acoustic transducer is arranged. The electric-acoustic transducer includes a casing, a first and second vibratory plates transversely mounted within the casing, and an exciter disposed between the first and second vibratory plates and operated to vibrate the first and second vibratory plates. The first vibratory plate cooperates with the exciter to define a first inner chamber therebetween. A sound pipe extends outwardly from the casing and is adapted to allow the first inner chamber to be communicated with the outside of the housing. The second vibratory plate cooperates with the exciter to define a second inner chamber therebetween. The casing has a through sound hole through which the second inner chamber is communicated with the outside of the casing. The sound pipe is kept out of communication with the through sound hole.

4 Claims, 10 Drawing Sheets

ELECTRIC-ACOUSTIC TRANSDUCER AND ELECTRIC-ACOUSTIC TRANSDUCER/HOUSING ASSEMBLY

This application claims priority under 35 U.S.C. §119 to Japanese Patent Application No. 2004-382174 Dec. 28, 2004, the entire content of which is hereby incorporated by reference.

FIELD OF THE INVENTION

The present invention relates to electronic devices with sound reproduction capability, such as a laptop computer, a PDA, a game machine and a pager and more particularly, to an electric-acoustic transducer and an electric-acoustic transducer/housing assembly.

BACKGROUND OF THE INVENTION

A typical cellular phone is capable of giving the user the melody of a song when an incoming call is received and also, transmitting an incoming voice signal to the user. The melody sound has a frequency of from 20 Hz to 20 kHz, whereas the voice sound has a frequency of from 300 Hz to 3 or 4 kHz. To this end, the cellular phone is generally provided with two different electric-acoustic transducers. To minimize the size of this kind of cellular phone, an attempt has been made to provide a single transducer assembly wherein two different transducers are integrated together.

Figure 10:
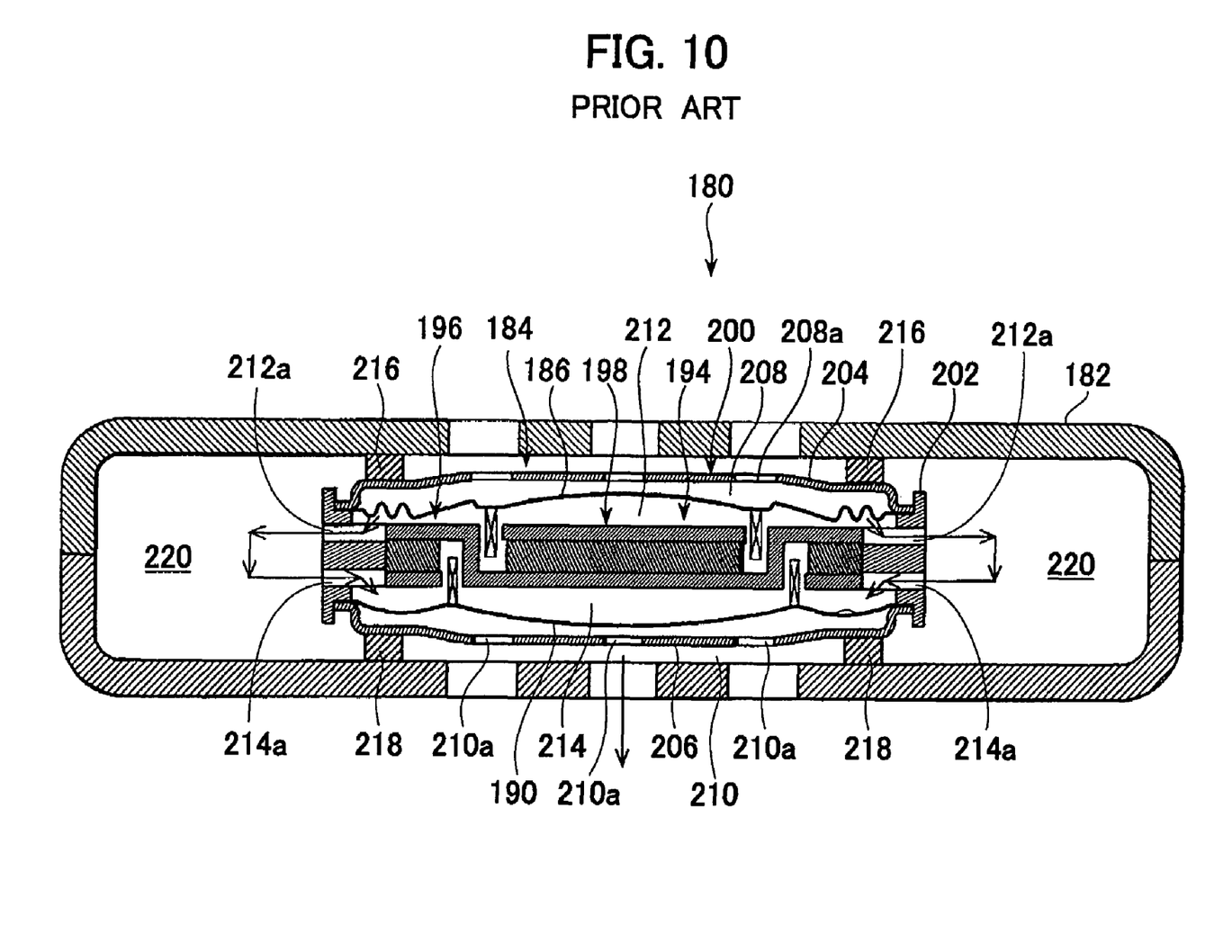
FIG. 10 is a sectional view of a known electric-acoustic transducer/housing assembly.

FIG. 10 shows one example of a cellular phone with a single electric-acoustic transducer assembly. The cellular phone includes a housing 182 and an electric-acoustic transducer assembly 184 arranged within the housing 182. The electric-acoustic transducer assembly 184 includes a first vibratory plate 186, a second vibratory plate 190 and an exciter 198 disposed between the first and second vibratory plates 186, 190 and having a first and second exciter section 194, 196 integrally formed together and adapted to induce vibration of the first and second vibratory plates 186, 190. In this example, the first vibratory plate 186 and the first exciter section 194 collectively form a first transducer adapted to give the user the melody of a song upon receipt of an incoming call. Similarly, the second vibratory plate 190 and the second exciter section 196 collectively form a second transducer adapted to transmit an incoming voice signal to the user.

The electric-acoustic transducer assembly 184 includes a casing 200 within which the exciter 198, the first vibratory plate 186 and the second vibratory plate 190 are housed. The casing is composed of an annular member 202 and a top and bottom cover 204, 206 connected at their opposite ends to the annular members 202.

As shown, a first outer chamber 208 is defined between the top cover 204 and the first vibratory plate 186, and a second outer chamber 210 is defined between the bottom cover 206 and the second vibratory plate 190. Similarly, a first inner chamber 212 is defined between the exciter 198 and the first vibratory plate 186, and a second inner chamber 214 is defined between the exciter 198 and the second vibratory plate 190. The top and bottom covers 204, 206 include respective sound openings 208a, 210a through which the first and second outer chambers 208, 210 are communicated with the outside of the casing 200. Similarly, the annular members 202 include respective sound openings 212a, 214a through which the first and second inner chambers 212, 214 are communicated with the outside of the casing 200.

The housing 182 has a plurality cushioning elements 216, 218 to support the transducer assembly. The cushioning elements 216, 218 define two side chambers 220, 220 within the housing 182. The first and second inner chambers are communicated with one another through these two side chambers. A problem with this structure is that the first and second vibratory plates 186, 190 interfere with each other due to the sound pressure developed by themselves.

It is, therefore, an object of the present invention is to provide an electric-acoustic transducer and an electric-acoustic transducer/housing assembly which overcomes the problem encountered in the known electric-acoustic transducer.

SUMMARY OF THE INVENTION

According to a first aspect of the present invention, there is provided an electric-acoustic transducer/housing assembly which includes a housing and an electric-acoustic transducer contained within the housing, wherein the electric-acoustic transducer includes a casing, a first vibratory plate extending in a direction transverse to the axis of the casing, a second vibratory plate extending in a direction transverse to the axis of the casing, an exciter extending in a direction transverse to the axis of the casing and disposed between the first and second vibratory plates, the exciter being operated to induce vibration of the first and second vibratory plates in response to respective electric signals, the exciter being associated with the first and second vibratory plates to define a first inner chamber between the exciter and the first vibratory plate and a second inner chamber between the exciter and the second vibratory plate, the casing including a first sound hole and a second sound hole which extend through the casing and communicated with the first and second inner chambers, respectively, a sound pipe extending outwardly from the casing and having an inner end communicated with the first sound hole and an outer end, the housing having a through opening, the outer end of the sound pipe being connected to the through opening of the housing so that the first inner chamber is communicated with outside of the housing.

In the assembly, the first inner chamber is communicated with the outside of the housing. This communication avoids acoustic interference between the first and second inner chambers within the housing.

In one embodiment, the housing has a retainer disposed within the housing to hold the electric-acoustic transducer in place.

In another embodiment, the housing has a top wall, a bottom wall and a peripheral wall extending between the top wall and the bottom wall. The housing defines a first chamber therewithin and includes an inner wall extending within the first chamber and defining a second chamber within the first chamber. The electric-acoustic transducer is mounted within the second chamber. The sound pipe extends through the inner wall and is connected to the through opening of the housing.

Specifically, the through opening of the housing is be formed in the top wall and the inner wall includes a top wall portion spaced away from the top wall of the housing and a peripheral side wall portion extending between the bottom wall of the housing and the top wall portion. The sound pipe extends through the top wall portion of the inner wall to the top wall of the housing and is connected to the through opening of the top wall. Further, the electric-acoustic transducer includes a first outer chamber defined in the casing with the first vibratory plate interposed between the first inner and outer chambers and a second outer chamber defined in the casing with the second vibratory plate interposed between the second inner and outer chambers. The second inner chamber is communicated with the second chamber defined by the inner wall, the first outer chamber is communicated with the first chamber defined by the housing, the second outer chamber is communicated with the outside of the housing, and, the first and second inner chambers and the first and second outer chambers are acoustically separated from each other in the housing.

According to a second aspect of the present invention, there is provided an electric-acoustic transducer/housing assembly which includes a housing and an electric-acoustic transducer arranged within the housing, wherein the electric-acoustic transducer includes a casing having an axis, a first vibratory plate extending in a direction transverse to the axis of the casing, a second vibratory plate extending in a direction transverse to the axis of the casing, an exciter extending in a direction transverse to the axis of the casing and disposed between the first and second vibratory plates, the exciter being operated to induce vibration of the first and second vibratory plates in response to respective electric signals, the exciter being associated with the first and second vibratory plates to define a first inner chamber between the exciter and the first vibratory plate and a second inner chamber between the exciter and the second vibratory plate, the casing including a first sound hole and a second sound hole which extend through the casing and are communicated with the first and second inner chambers, respectively, a sound pipe extending outwardly from the casing and having an inner end communicated with the first sound hole and an outer end, the housing including a partition disposed to divide the interior of the housing into a first chamber and a second chamber separated from the first chamber, the electric-acoustic transducer being arranged within the first chamber, the outer end of the sound pipe being communicated with the second chamber.

The assembly also avoids acoustic interference between the first and second inner chambers within the housing.

According to a third aspect of the present invention, there is provided an electric-acoustic transducer comprising a casing having an axis, a first vibratory plate extending in a direction transverse to the axis of the casing, a second vibratory plate extending in a direction transverse to the axis of the casing, an exciter extending in a direction transverse to the axis of the casing and disposed between the first and second vibratory plates, the exciter being operated to induce vibration of the first and second vibratory plates in response to respective electric signals, the exciter being associated with the first and second vibratory plates, respectively to define a first inner chamber between the exciter and the first vibratory plate and a second inner chamber between the exciter and the second vibratory plate, the casing including a first and second sound hole extending through the casing and communicated with the first and second inner chambers, respectively, a sound pipe extending outwardly from the casing and having an inner end communicated with the first sound hole and an outer end.

The electric-acoustic transducer, when associated with a housing as described above, avoids acoustic interference between the first and second inner chambers.

ADVANTAGES OF THE INVENTION

According to the present invention, the electro-acoustic transducer is configured to prevent communication between the first and second inner chambers within the housing and thus, can overcome the problem encountered in the prior art transducer.

PREFERRED EMBODIMENTS

The present invention will now be described with reference to the accompanying drawings.

Figure 1:
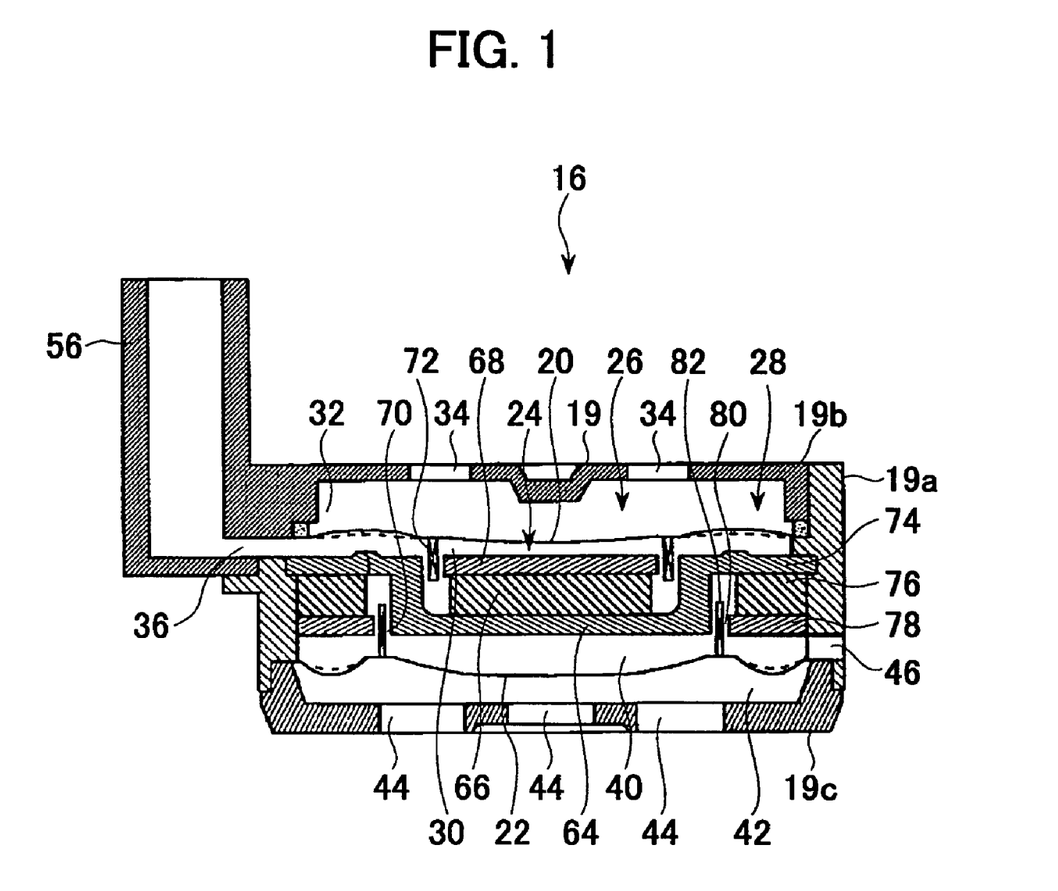
FIG. 1 is a sectional view of an electric-acoustic transducer according to the present invention.

FIG. 1 shows an electric-acoustic transducer according to a first embodiment of the present invention.

An electric-acoustic transducer 16 includes a casing 19, first and second vibratory plates 20, 22 extending in a direction transverse to the axis of the casing 19, and an exciter 24 located within the casing 19 and disposed between the first and second vibratory plates 20, 22. The exciter 24 is composed of a first exciter section 26 and a second exciter section 28 adapted to induce vibration of the respective first and second vibratory plates 20, 22 in response to a corresponding electric signal.

A first inner chamber 30 is defined between the first vibratory plate 20 and the exciter 24, and a first outer chamber 32 is defined between the first vibratory plate 20 and the adjacent or top wall of the casing 19. The first vibratory plate 20, the first exciter section 26 and the first inner and outer chambers 30, 32 collectively form a first transducer section. When the transducer 10 is used in, for example, a cellular phone, the first transducer section gives the user the melody of a song upon receipt of an incoming call. The first transducer section includes a first axial sound hole 34 extending axially through the top wall of the casing 19 and opening to the first outer chamber 32, and a first radial sound hole 36 extending radially through the peripheral side wall of the casing 19 and opening to the first inner chamber 30.

A second inner chamber 40 is defined between the second vibratory plate 22 and the exciter 24, and a second outer chamber 42 is defined between the second vibratory plate 20 and the bottom wall of the casing 19. The second vibratory plate 20, the second exciter section 28 and second inner and outer chambers 40, 42 collectively form a second transducer section. When the transducer 10 is used in, for example, a cellular phone, the second transducer section transforms an incoming voice signal into voice. The second transducer section has a second axial sound hole 44 extending axially through the bottom wall of the casing 19 and opening to the second outer chamber 42, and a second radial sound hole 46 extending radially through the peripheral side wall of the casing 19 and opening to the second inner chamber 40.

Figure 2:
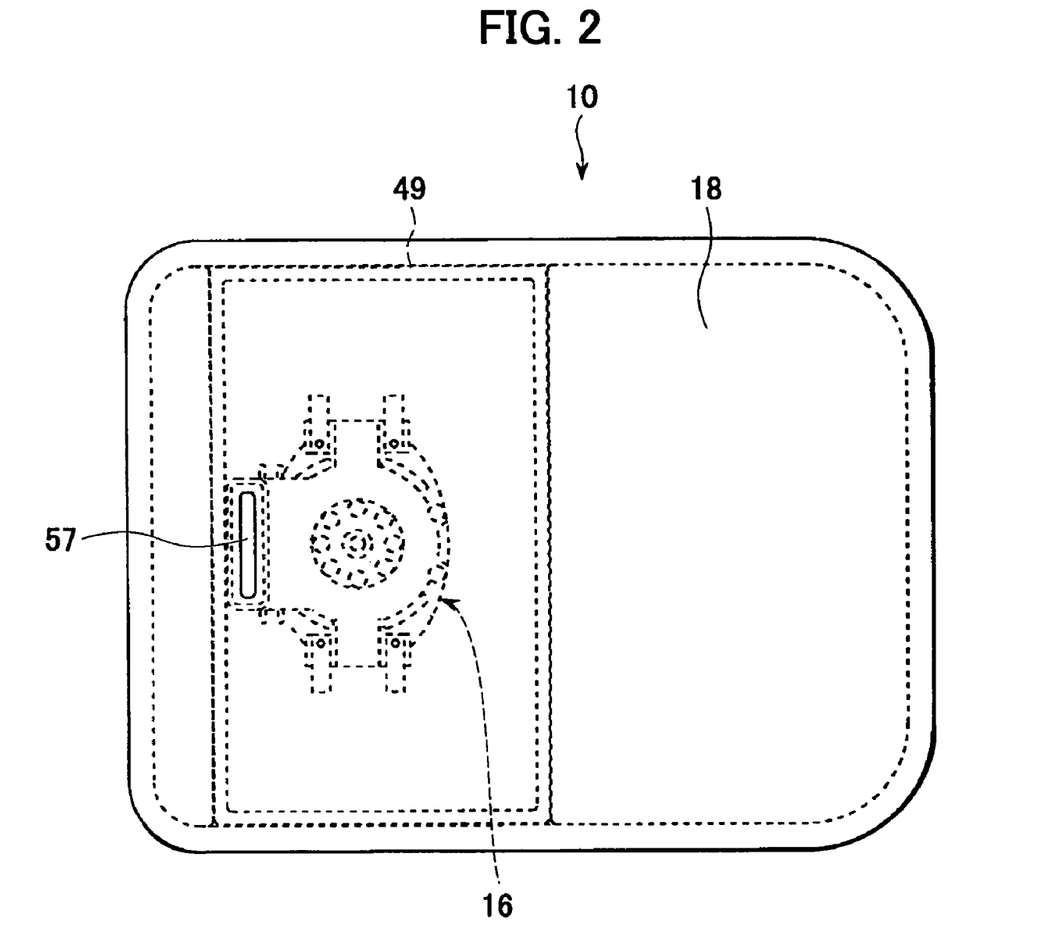
FIG. 2 is a plan view of an electric-acoustic transducer/housing assembly wherein the transducer is enclosed within the housing.
Figure 3:
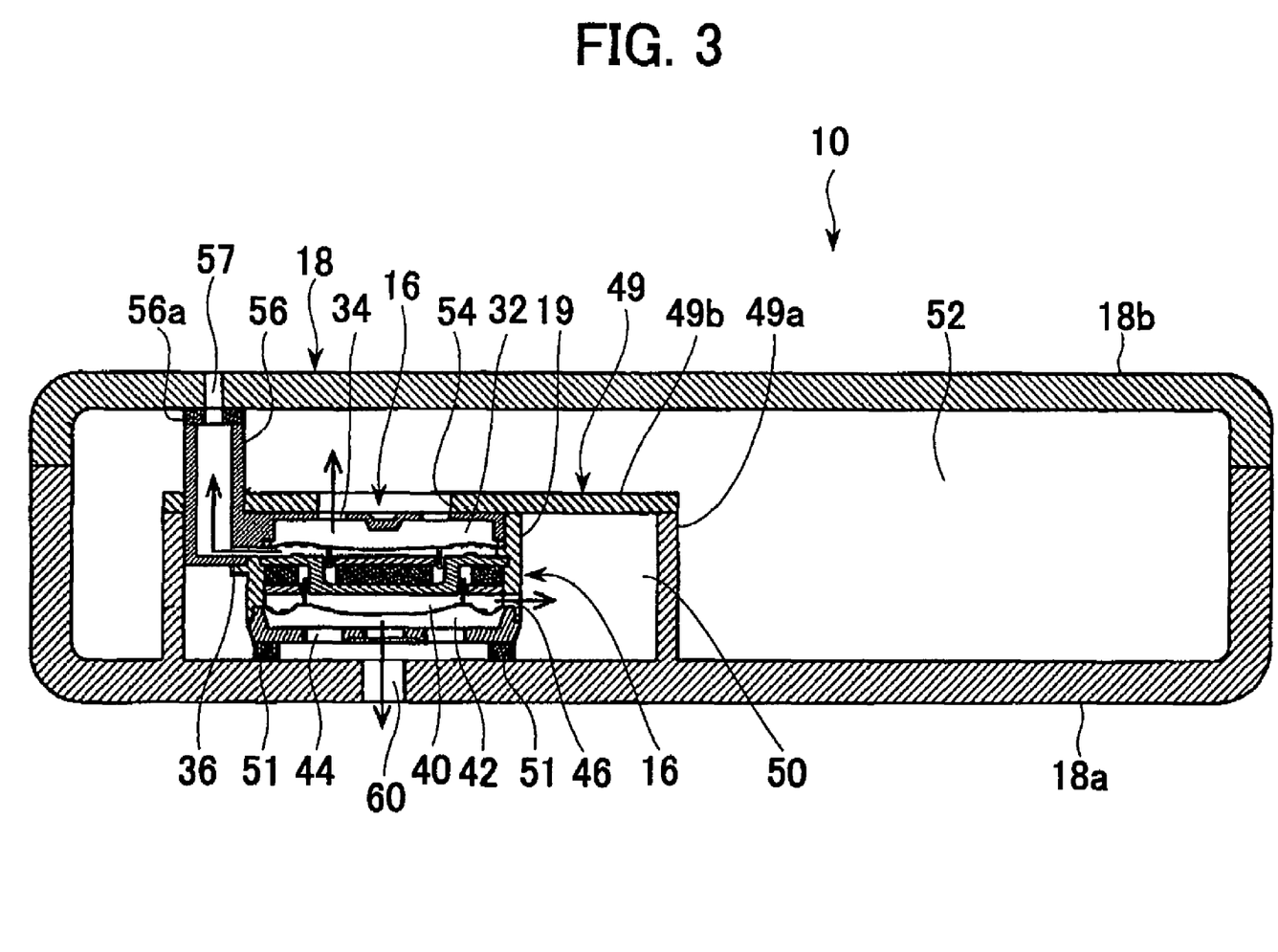
FIG. 3 is a sectional view of the assembly shown in FIG. 2.

Referring to FIGS. 2 and 3, there is illustrated an electric-acoustic transducer/housing assembly 10 wherein the transducer shown in FIG. 1 is assembled into and enclosed within a housing 18. The housing 18 is adapted for use in a cellular phone and other electronic or electrical devices. As shown better in FIG. 3, the housing 18 is composed of an outer wall and an inner wall 49. The outer housing wall includes a rectangular housing body 18a and a cover 18b connected to the open top of the housing body 18a. The inner wall 49 includes a rectangular side wall 49a having an upper end and a lower end connected to the bottom of the housing body 18a, and a top wall 49b connected to the upper end of the side wall 49a. The inner wall 49 of the housing 18 defines a chamber 50 within which the transducer 16 is arranged and supported by a pair of cushioning elements or pads 51.

A through opening 54 is defined in the top wall 49b of the inner wall 49 and cooperates with the first axial sound hole 34 to provide a communication between the first outer chamber 32 and a chamber 52 which is defined between the outer wall and the inner wall 49. A sound pipe 56 has one end connected to the first radial sound hole 36 and the other end connected through an annular gasket 56a to the inner surface of the cover 18b. A through hole 57 is defined in the cover 18b and communicated with the sound pipe 56. The first radial sound hole 36, the sound pipe 56 and the through hole 57 are associated together to allow the first inner chamber 30 to be communicated with the outside of the housing 18.

The housing 18 is also formed at its bottom with a through hole 60. The through hole 60 cooperates with the second axial sound hole 44 to allow the second outer chamber 42 of the second transducer section to be communicated with the outside of the housing 18. The second inner chamber 40 is communicated with the chamber 50 through the second radial sound hole 46.

In the illustrated embodiment, the first radial sound hole 36 is communicated with the outside of the housing 18 under the existence of the sound pipe 56 and will in no way be communicated with the second radial sound hole 46. This arrangement prevents acoustic interference between the first and second vibratory plates 20, 22 through the first and second radial sound holes 36, 46.

Referring back to FIG. 1, the first exciter section 26 generally includes a first yoke 64, a first permanent magnet 66 arranged in the first yoke 64, a first yoke plate 68 placed over the first permanent magnet 66 and a cylindrical first voice coil 72 disposed in an annular first magnetic gap 70 defined between the first yoke plate 68 and the first yoke 64 and carried by the first vibratory plate 20. Similarly, the second exciter section 28 generally includes a second yoke 74 integrally formed with the first yoke 64, an annular second permanent magnet 76 placed on the second yoke 74, an annular second yoke plate 78 and a cylindrical second voice coil 82 disposed between a second magnetic gap 80 defined between the second yoke plate 78 and the second yoke 74 and carried by the second vibratory plate 22.

The casing 19 includes an annular side wall 19a, a top wall 19b and a bottom wall 19c. The sound pipe 56 is integrally formed with the top wall 19b. The term "casing" used herein is not limited to the illustrated embodiment, but may include an transducer cover and other elements which collectively enclose the first and second vibratory plates, the exciter and other elements.

Figure 4:
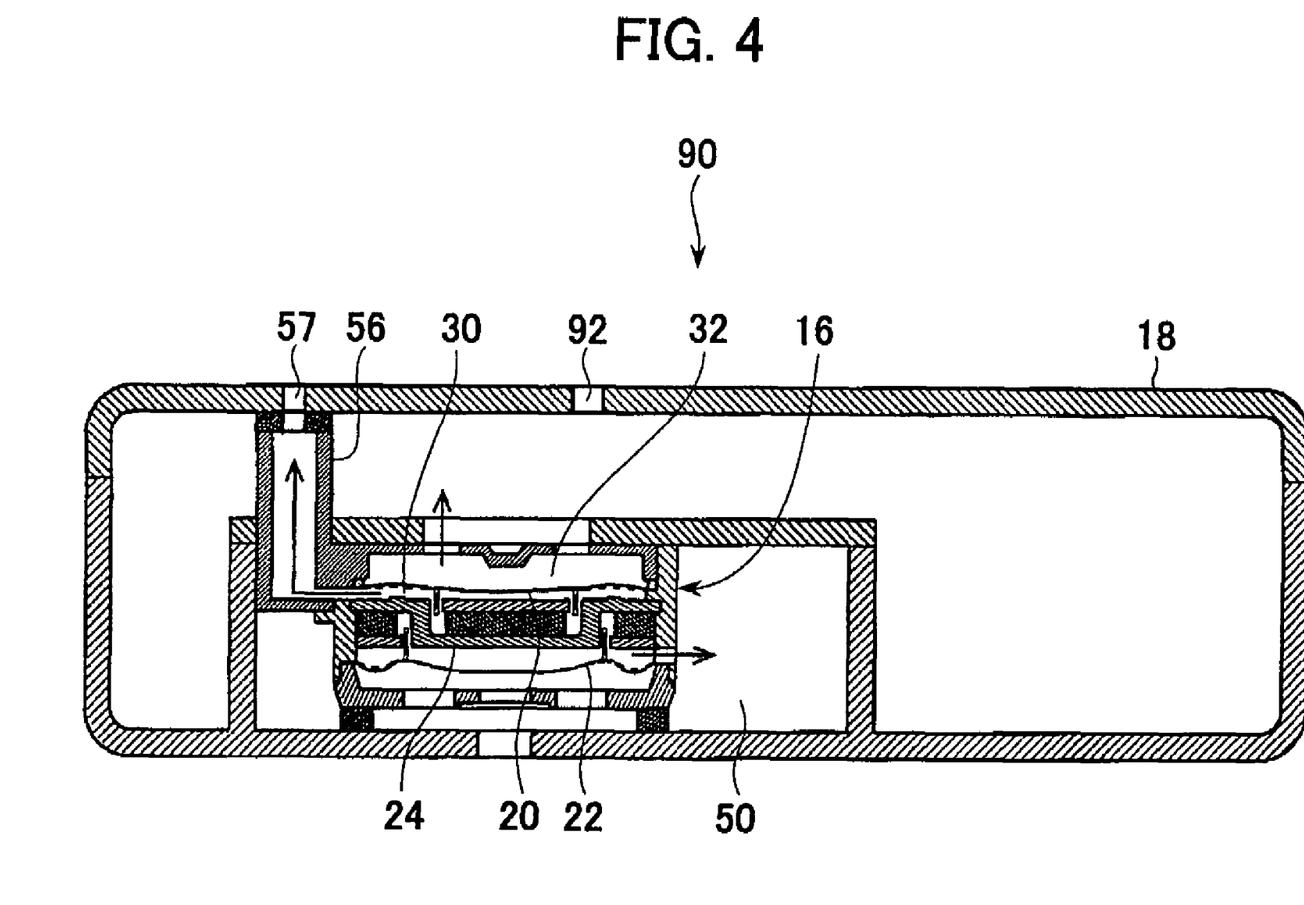
FIG. 4 is a sectional view of an electric-acoustic transducer/housing assembly according to a second embodiment of the present invention.

Referring now to FIG. 4, there is illustrated an electric-acoustic transducer/housing assembly made according to a second embodiment of the present invention and generally designated as at 90.

The assembly 90 differs from the assembly 10 only in that in the former, a hole 92 is defined in the housing 18. Like elements are given like reference numerals used in the first embodiment and will not be described herein (This comment equally applies to the third and subsequent embodiments).

In this embodiment, sound produced within the first outer chamber 32 is emitted to the outside of the housing 18 through the hole 92. Sound produced within the first inner chamber 30 is also emitted to the outside of the housing through the through hole 57. This arrangement provides for sound pressure compensation and can be useful for the GSM standards. As an alternative to this embodiment, a hole may be defined in the housing to allow the chamber 50 to be communicated with the outside of the housing.

Figure 5:
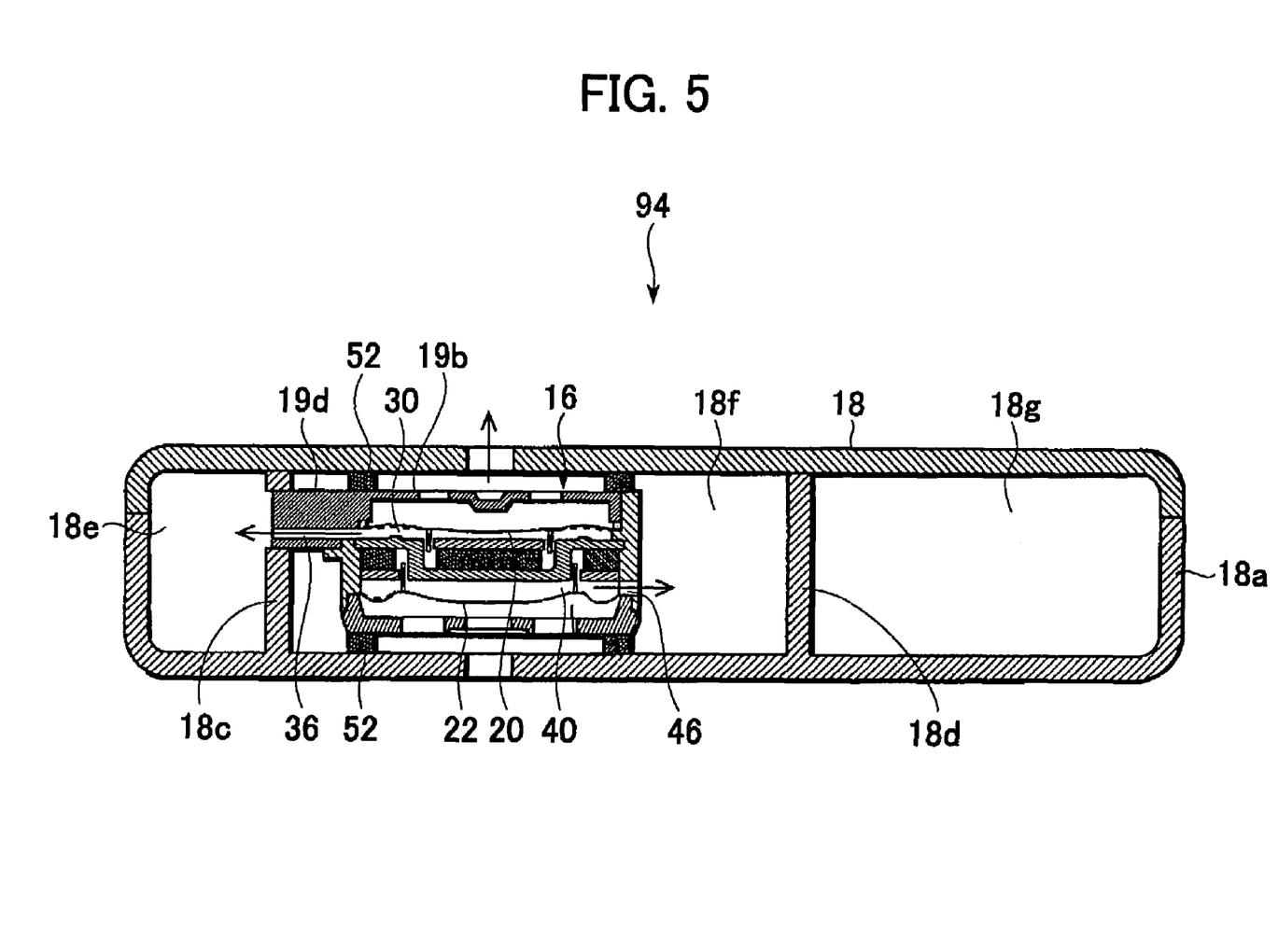
FIG. 5 is a sectional view of an electric-acoustic transducer/housing assembly according to a third embodiment of the present invention.
Figure 6:
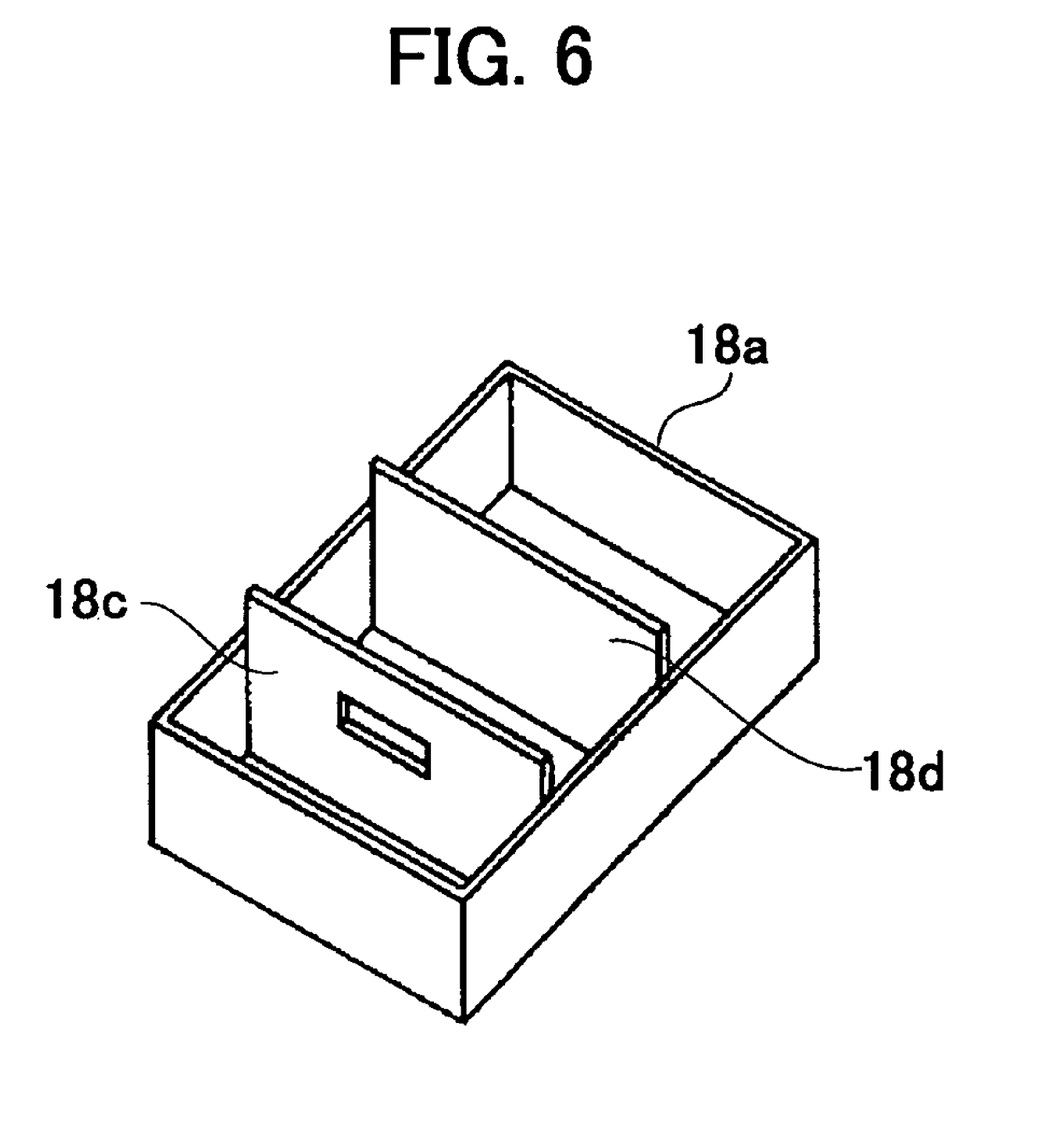
FIG. 6 is a perspective view of the housing shown in FIG. 5.

FIGS. 5 and 6 show an electric-acoustic transducer/housing assembly made according to a third embodiment of the present invention and generally designated as at 94.

In this embodiment, two spaced partitions 18c, 18d extend between the top and bottom walls of the housing 18 to divide the interior of the housing 18 into three consecutive chambers, that is, a left chamber 18e, a central chamber 18f and a right chamber 18g. Upper and lower cushioning elements 52 are disposed within the central chamber 18f and located between the housing 18 and the transducer 16. Advantageously, a part of the casing 19 defines a sound hole 19d which corresponds in function to the sound pipe 56 used in the first and second embodiments. The first inner chamber 30 is communicated with the left chamber 18e through the sound hole 19d, whereas the second inner chamber 40 is communicated with the central chamber 18e through the second radial hole 46. This arrangement also prevents acoustic interference between the first and second vibratory plates.

Figure 7:
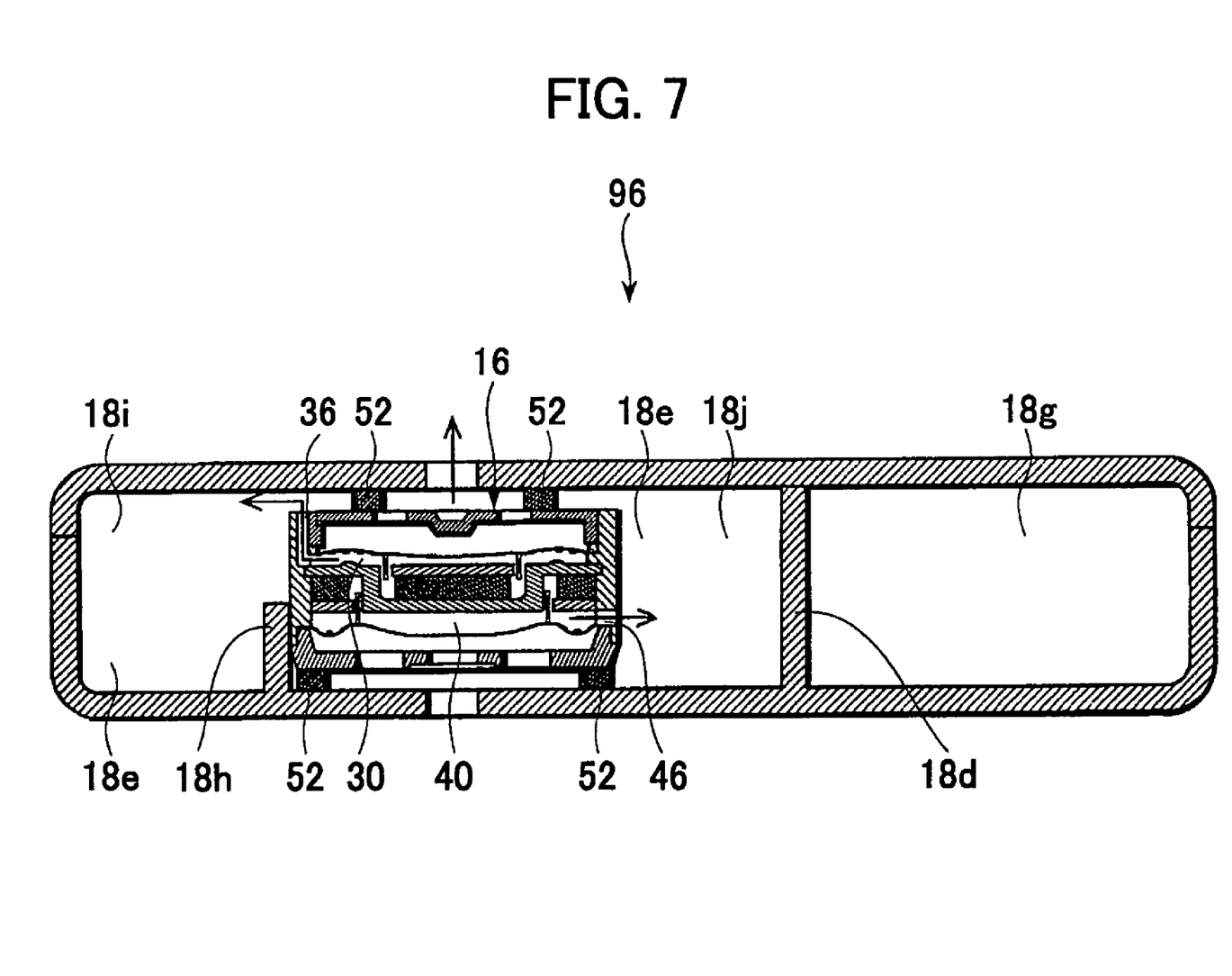
FIG. 7 is a sectional view of an electric-acoustic transducer/housing assembly according to a fourth embodiment of the present invention.
Figure 8:
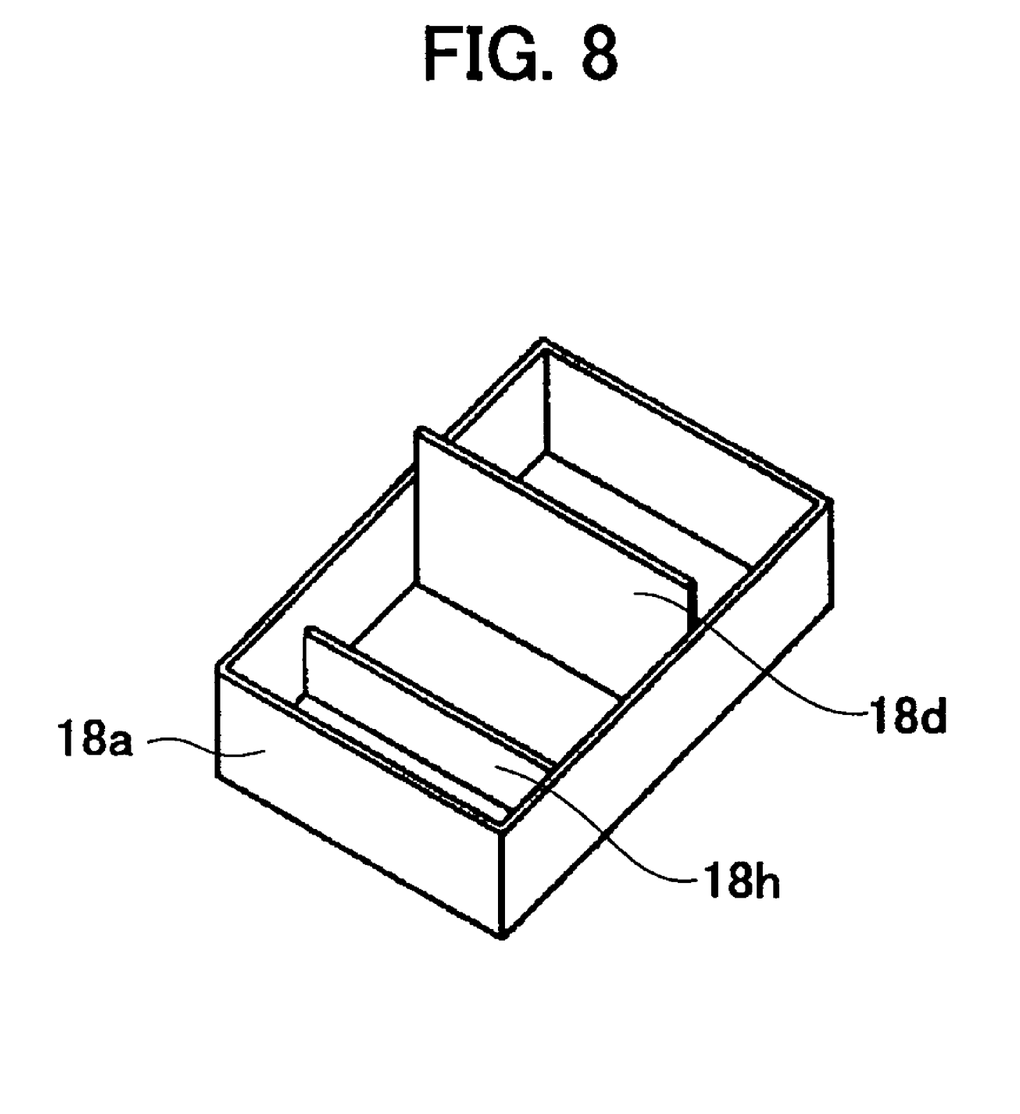
FIG. 8 is a perspective view of the housing shown in FIG. 7.

FIGS. 7 and 8 show an electric-acoustic transducer/housing assembly made according to a fourth embodiment of the present invention and generally designated by 96.

In this embodiment, a partition 18d extends between the top and bottom walls of the housing to divide the interior of the housing into two chambers, that is, a right chamber and a left chamber within which the transducer 16 is arranged. A retaining wall 18h extends upwardly from the bottom wall of the housing 18. The transducer is joined to the retaining wall 18h. Upper and lower cushioning elements 52 are disposed between the transducer 16 and the housing 18. The cushioning elements 52 divide the interior of the left chamber into two adjacent subchambers, that is, a left subchambers 18i and a right subchamber 18j. The two subchambers 18i, 18j are disconnected from one another. The first and second inner chambers 30, 40 are communicated with the left and right subchambers 18i, 18j, respectively.

Figure 9:
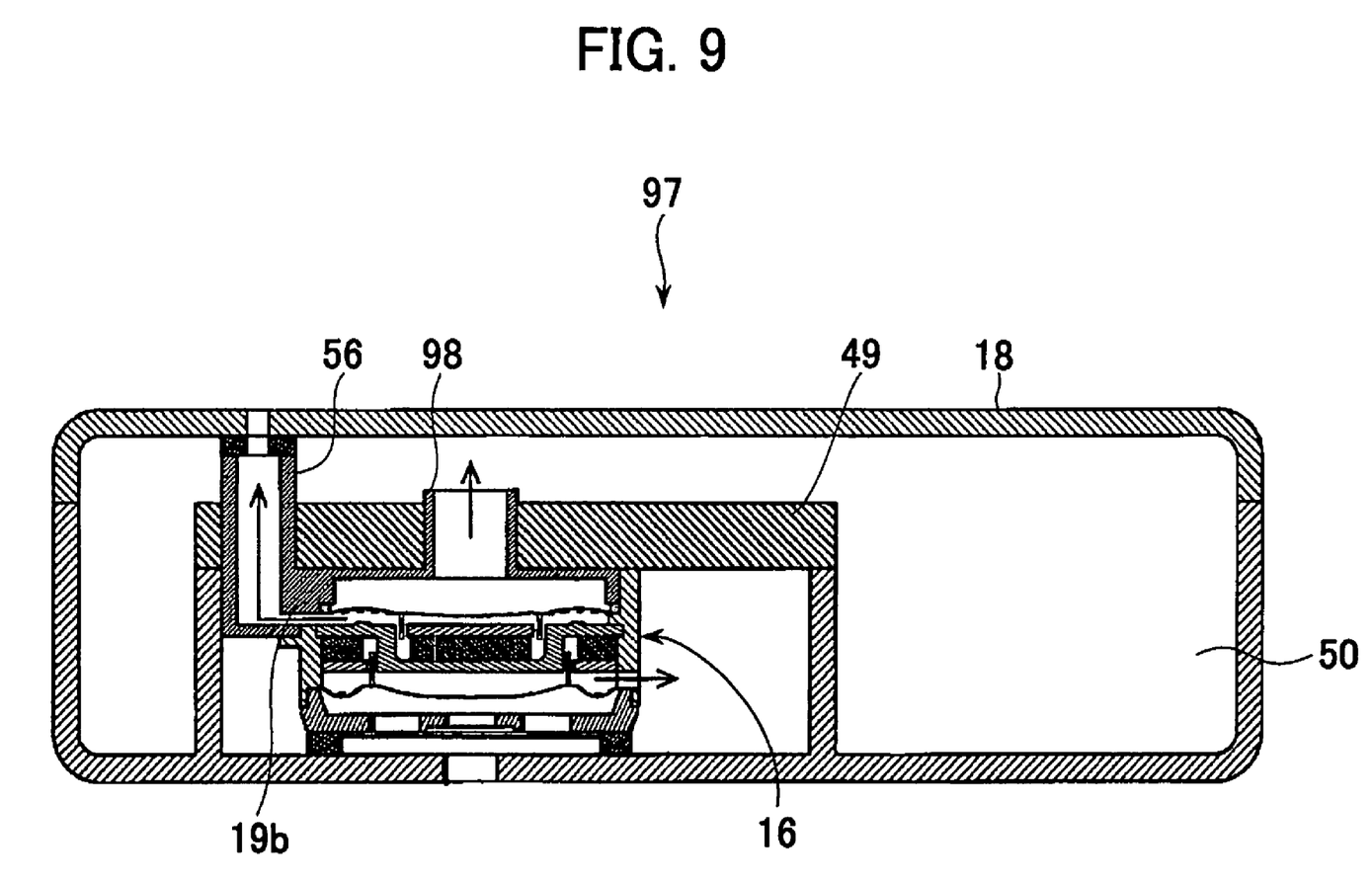
FIG. 9 is a sectional view of an electric-acoustic transducer/housing assembly according to a fifth embodiment of the present invention.

FIG. 9 shows an electric-acoustic transducer/housing assembly made according to a fifth embodiment of the present invention and generally designated by 97.

The assembly 97 differs from the first embodiment only in that in the former, an additional sound pipe 98 extends upwardly from the upper wall 19b of the casing 19 and is communicated with the chamber 50 of the housing 18.

INDUSTRIAL APPLICABILITY

The present invention is widely applicable to a cellular phone, a personal or laptop computer, a PDA (personal digital assistant), a portable game machine, a pager and other electronic devices with an electric-acoustic transducer.

Although the present invention has been described in terms of specific embodiments, it is anticipated that alternations and modifications thereof will no doubt become apparent to those skilled in the art. It is therefore intended that the following claims be interpreted as covering all such alternations and modifications as fall within the true sprit and scope of the invention.

What is claimed is:

1. An electric-acoustic transducer/housing assembly comprising:
   a housing; and
   an electric-acoustic transducer contained within the housing, the electric-acoustic transducer comprising:
   a casing having an axis;
   a first vibratory plate extending in a direction transverse to the axis of the casing;
   a second vibratory plate extending in a direction transverse to the axis of the casing;
   an exciter extending in a direction transverse to the axis of the casing and disposed between the first and second vibratory plates, the exciter being operated to induce vibration of the first and second vibratory plates in response to respective electric signals, the exciter being associated with the first vibratory plate to define a first inner chamber between the exciter and the first vibratory plate, and the exciter being associated with the second vibratory plate to define a second inner chamber between the exciter and the second vibratory plate; and
   the casing including a first sound hole and a second sound hole, the first and second sound holes extending through the casing and communicated with the first and second inner chambers, respectively,
   a sound pipe extending outwardly from the casing and having an inner end communicated with the first sound hole and an outer end,
   the housing having a through opening,
   the outer end of the sound pipe being connected to the through opening of the housing so that the first inner chamber is communicated with outside of the housing;
   wherein the housing has a top wall, a bottom wall and a peripheral side wall extending between the top wall and the bottom wall, and the housing defines a first chamber therewith and includes an inner wall extending within the first chamber and defining a second chamber within the first chamber, the electric-acoustic transducer being mounted within the second chamber, the sound pipe extending through the inner wall of the housing and connected to the through opening of the housing.

2. The assembly of claim 1, wherein the housing has a retaining wall disposed within the housing to hold the electric-acoustic transducer in place.

3. The assembly of claim 1, wherein
   the through opening of the housing is formed in the top wall;
   the inner wall includes a top wall portion spaced away from the top wall of the housing and a peripheral side wall portion extending between the bottom wall of the housing and the top wall portion; and,
   the sound pipe extends through the top wall portion to the top wall of the housing and is connected to the through opening of the top wall.

4. The assembly of claim 3, wherein
   the electric-acoustic transducer includes a first outer chamber defined in the casing with the first vibratory plate interposed between the first inner and outer chambers and a second outer chamber defined in the casing with the second vibratory plate interposed between the second inner and outer chambers;
   the second inner chamber is communicated with the second chamber defined by the inner wall;
   the first outer chamber is communicated with the first chamber defined by the housing;
   the second outer chamber is communicated with the outside of the housing; and,
   the first and second inner chambers and the first and second outer chambers are acoustically separated from each other in the housing.

* * * * *